United States Patent [19]
Senter et al.

[11] 3,749,450
[45] July 31, 1973

[54] WHEEL ADAPTATION MEANS

[75] Inventors: Louis Senter; Robert E. Johnson, both of Gardena, Calif.

[73] Assignee: Whittaker Corporation, Los Angeles, Calif.

[22] Filed: Oct. 22, 1969

[21] Appl. No.: 868,315

[52] U.S. Cl............................... 301/9 DN, 301/65
[51] Int. Cl.............................................. B60f 3/16
[58] Field of Search..................... 301/9 DN, 65, 36, 301/9 AN, 9 SD

[56] References Cited
UNITED STATES PATENTS

| | | | |
|---|---|---|---|
| 3,329,468 | 7/1967 | Beith................................ | 301/9 DN |
| 3,428,365 | 2/1969 | French............................. | 301/9 DN |
| 3,459,455 | 8/1969 | Muench........................... | 301/9 DN |
| 3,207,557 | 9/1965 | Hunter............................ | 301/9 DN X |
| 3,006,443 | 10/1961 | Siler.................................. | 85/1 R X |
| 3,649,079 | 3/1972 | English............................. | 301/9 DN |

*Primary Examiner*—Richard J. Johnson
*Attorney*—Donald E. Nist

[57] ABSTRACT

A vehicle wheel having a central hub portion defining a plurality of radially-spaced apertures extending therethrough for receiving the wheel mounting bolts of a vehicle. Each aperture is tapered at one end to receive a similarly tapered insert and may form a recess at its other end to receive a washer. Each insert and washer has, in one embodiment, an eccentrically-positioned hole so that, by appropriately adjusting the washer and insert in each aperture, the wheel can be made to fit mounting bolt patterns of different radii.

9 Claims, 6 Drawing Figures

PATENTED JUL 31 1973   3,749,450
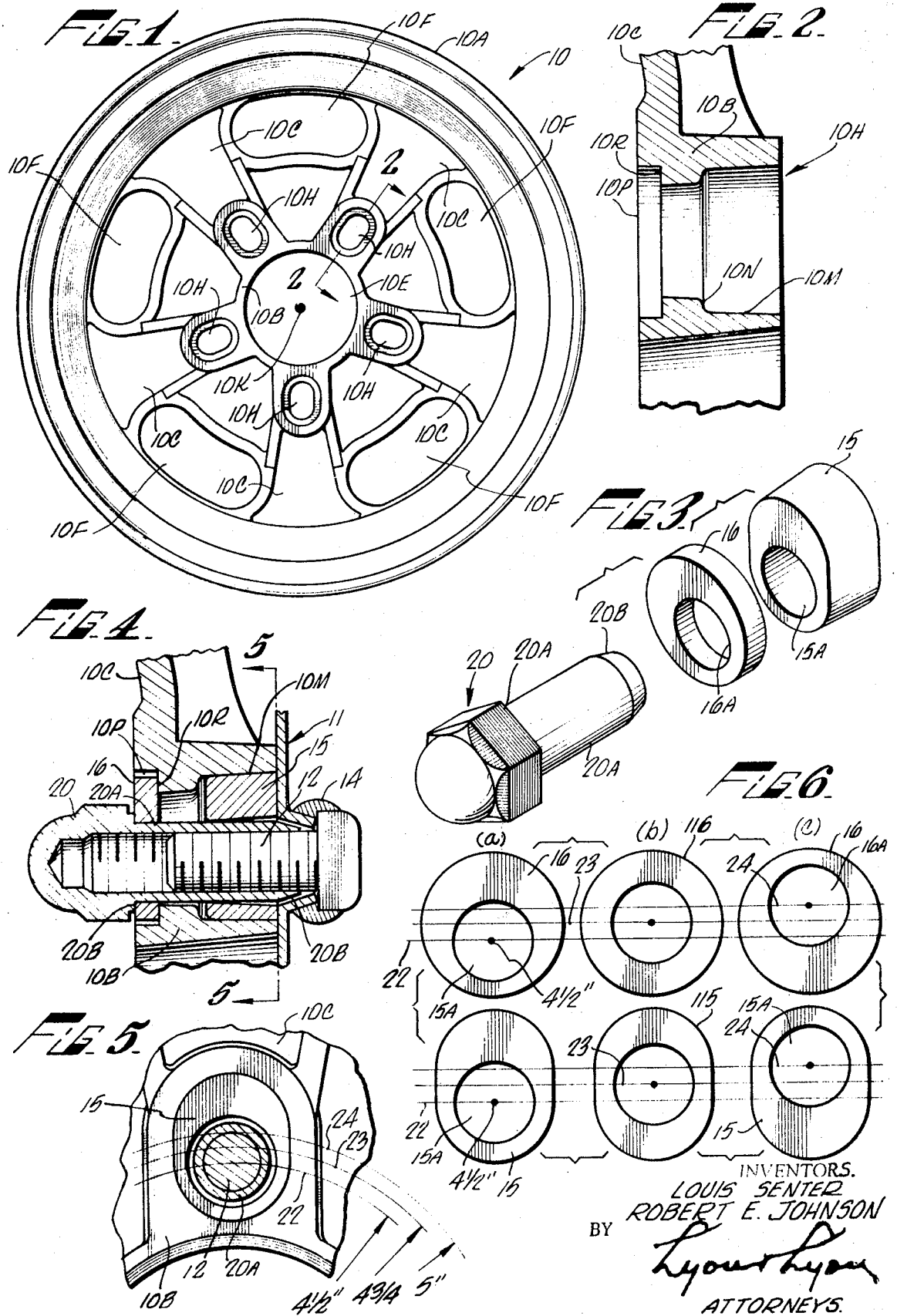
INVENTORS.
LOUIS SENTER
ROBERT E. JOHNSON
BY
Lyon+Lyon
ATTORNEYS.

WHEEL ADAPTATION MEANS

BACKGROUND OF THE INVENTION

This invention relates to vehicle wheels and, more particularly, to wheels capable of being mounted on vehicles having wheel mounting bolt patterns of different radii.

The usual method of mounting a wheel on a vehicle comprises fitting the wheel over a plurality of mounting bolts by slipping the bolts through aligned apertures in the wheel's hub section and threading nuts onto the projecting ends of the bolts to lock the wheel thereon. While the mounting bolts are normally arranged in circular patterns, the diameters of the bolt circles can and do vary from one make of vehicle to another.

Until recently, wheels were made to conform only to one bolt pattern so that each wheel manufacturer made, and each wheel retailer had to carry, a number of wheels in each overall wheel design category to fit the various bolt patterns. This is still the usual approach taken by wheel manufacturers. Since each wheel design has to be duplicated except for its bolt hole pattern, the cost of manufacture using this approach is high.

Recently, wheels have been made available which can accommodate two or more bolt patterns of different diameter. This is accomplished in various ways, one of which is to provide each wheel with a plurality of bolt-receiving apertures sized to accommodate two or more different-diameter bolt patterns. To cause the bolt to be snugly received by the wheel, there is provided a multi-holed plate such as that described in U.S. Pat. No. 3,459,455, issued Aug. 5, 1969 to C.A. Muench et al. or adapters defining eccentrically positioned holes as described in U.S. Pat. No. 3,329,468, issued July 4, 1967 to R.D. Beith.

The Muench et al. plate is provided with two or more series of apertures with each series having the same number of apertures as there are mounting bolts, but with the apertures in each series radially offset from the corresponding apertures in another series and with each series describing a circle of different diameter. The plate also includes projections adjacent each hole to partially fill the over-sized apertures in the wheel when the plate is placed against the inner side of the wheel to leave only bolt-sized openings in the wheel apertures corresponding to a particular bolt pattern to which the wheel is to be fitted. While this method permits the same wheel to be fitted to more than one bolt hole pattern, its primary disadvantage is that the plate must be machined to close tolerances because of the required alignment of a large number of holes and projections in the plate and wheel. Such close-tolerances machining adds significantly to the cost of manufacture.

The Beith patent employs adapters which are fitted into an expanded end of each wheel aperture such that each adapter seats on a shoulder and is held thereon by tightening nuts on the mounting bolts. Again, to ensure that the adapters are correctly seated and to prevent the adapters from moving about within the wheel apertures, they must be machined to close tolerances with its attendant expense. A further disadvantage of the Beith invention is that it positions a wheel on the mounting bolts so that it has a relatively long moment arm with respect to the inner end of the bolts. This results from the point of contact between the wheel and mounting bolts being placed at the outer edge of the wheel's hub section. As a result, the mounting bolts are subjected to a considerable bending force which may break them.

SUMMARY OF THE INVENTION

The wheel of this invention has formed therein a plurality of apertures equal in number to the number of wheel mounting bolts on a vehicle axle and positioned radially about the wheel center to receive the mounting bolts. The apertures are sized to receive mounting bolts in circular patterns of different radii. Each aperture, in the preferred embodiment, has an enlarged inner end which is tapered to receive a correspondingly tapered, apertured insert which, in one embodiment, has an eccentrically positioned hole. By turning the insert, bolt patterns of different diameter can be accommodated. The outer end of each wheel aperture is also preferably enlarged to receive an apertured washer which, in one embodiment, has an accentrically positioned hole which can be aligned with the hole in the insert.

When a wheel having the aforementioned insert and washer is fitted over a set of mounting bolts and tightened onto the bolts by nuts threaded onto the latter, the inserts are drawn deeper into the tapered inner ends of the wheel apertures until they are effectively jammed in the apertures. At this point, the wheel is firmly mounted on the mounting bolts.

The primary advantage of this invention is that close tolerance machining is not necessary either for the wheel apertures or for the inserts. Even though the latter may vary somewhat in size among themselves, they will still be firmly wedged in the wheel apertures after the mounting bolt nuts are tightened because each will seek its own depth at which it is firmly wedged in the wheel aperture in which it is initially placed. This advantage is obtained because the inserts do not seat as is required, for example, in the aforementioned Beith patent. Therefore, the close tolerance machining of parts which must seat to function properly is not required, thereby providing substantial cost savings.

A major advantage which is obtainable from use of the preferred embodiment of this invention is that a wheel's moment arm relative to the inner ends of the mounting bolts is minimized thereby substantially preventing breakage of the bolts due to bending forces applied to the bolts through the wheel. This advantage is obtained from the use of the inserts adjacent the inner side of the wheel's hub section which places the points of contact between the wheel and mounting bolts close to the inner ends of the bolts. In this respect, the herein-described wheels function in much the same way as do standard wheels with their smaller diameter bolt holes. Thus, these wheels provide a reduced wheel moment arm characteristic of standard wheels even though enlarged bolt holes are used to accommodate a plurality of bolt pattern radii.

In addition to the foregoing advantages, other advantages include the ability of the herein-described wheel to be readily converted to accommodate mounting bolt patterns of different radii and the simplicity of the components for accomplishing this.

DESCRIPTION OF THE DRAWING

FIG. 1 is a view of the rear or inside portion of a wheel embodying features of the present invention.

FIG. 2 is a sectional view taken as indicated by the line 2—2 in FIG. 1.

FIG. 3 is a perspective view illustrating components used in securing the wheel on an automobile.

FIG. 4 is a sectional view through the wheel of FIG. 1 when assembled on an automobile using components illustrated in FIG. 3.

FIG. 5 is a sectional view taken as indicated by the lines 5—5 in FIG. 4.

FIG. 6 illustrates three different arrangements used when the mounting stud bolts of the automobile are on a circle having a radius of 4 ½ inches, 4 ¾ inches and 5 inches respectively.

DESCRIPTION OF THE PREFERRED EMBODIMENT

As illustrated, the wheel 10 of a composition of aluminum and magnesium includes a tire mounting peripheral portion 10A with which a central hub portion 10B is integrally formed by five interconnecting spoke portions 10C.

This central portion 10B has a central opening 10E and there are five openings 10F adjacent to and corresponding to each of the five spoke portions 10C.

The central hub portion 10B has five special apertured and shouldered portions 10H, one of which is illustrated in FIG. 2, for mounting the wheel on the automobile hub portion 11 (FIG. 4) from which a corresponding number of five stud bolts 12 extend. This series of five stud bolts 12 is affixed to the automobile hub portion 11, which indeed may be a brake drum, using conventional means as, for example, by a press fit or the like, and for purposes of illustrating the fact that the elements 11 and 12 are normally permanently affixed, the drawings illustrate this to be accomplished by a weld 14.

Referring to FIG. 2, each apertured and shouldered portion 10H is generally oblong with its longitudinal axis extending radially from the center point 10K (FIG. 1) of the wheel and includes an inner tapered oblong opening 10M which terminates at a shouldered portion 10N and an outer round portion 10P which terminates at a shouldered portion 10R.

The inner tapered oblong opening 10M is formed to snugly receive a tapered die cast insert 15 and the outer round opening 10P is substantially larger than a steel washer 16 which may be easily inserted and removed from such opening 10P during mounting and dismounting of the wheel from the automobile.

A special nut 20 having an elongated internally threaded cylindrical portion 20A and a shouldered portion 20B is threaded on a corresponding one of the stud bolts 12 to secure the wheel to the automobile hub portion 11 in the manner illustrated in FIG. 4.

The arrangement is particularly useful for mounting of wheels on different automobiles wherein the studs 12 are on circles of different diameter as illustrated in FIGS. 5 and 6. The mounting as previously described is applicable where the studs 12 are equally spaced along a circle 22 (FIG. 5) having the indicated radius of 4 ½ inches. In such case for bolt circles of 4 ½ inches, the circular but off-centered apertured portions 15A, 16A respectively of insert 15 and washer 16 are assembled closest to the wheel center 10K (FIG. 1) such that the center of such apertured portions 15A, 16A, is on the bolt circle 22. This condition is also diagrammatically illustrated in FIG. 6. When the mounting stud bolts 12 lie on a circle 24 having a diameter of 5 inches the insert 15 and washer 16 is assembled in inverted position in which case the center of corresponding apertured portions 15A, 16A, are each on such 5 inch bolt circle 24.

In those instances where the bolts 12 are on a mounting circle 23 having a diameter of 4 ¾ inches as indicated in FIGS. 5 and 6, the insert 15 and washer 16 then take the form of corresponding inserts 115 and washer 116 in FIG. 6 where now the corresponding apertured portions 115A and 116A are not off-centered and have their centers lying on the bolt circle 23 of 4 ¾ inch diameter.

It will thus be seen that for adapting to any one of the three conditions, namely: 4 ½, 4 ¾, and 5 inch bolt mounting diameter only, two inserts 15, 115 and two washers 16, 116 are required.

In either case there is a solid connection between the wheel 10 and automobile hub portion 11 without the mounting studs 12 being subjected to a bending moment. This is so since the area of contact between the insert 15 and hub portion 11 is large and of course close to the bolt 12. During assembly, the tapered insert 15 assumes an optimum position within the tapered opening 10M because such assembly is accomplished by first loosely hand-fitting the insert 15 into its opening 10M, then mounting the wheel with the loosely fitted insert on the stud, then threading the nut 20 with the washer 16 loosely retained on the shouldered nut portion 20A on the stud bolt 12 in which case the tapered insert becomes increasingly wedged into its tapered opening 10M until the central wheel hub portion 10B contacts the automobile hub portion. This assures that the contact surfaces of the insert and central wheel portion are then coplanar as illustrated in FIG. 4. This construction also facilitates subsequent wheel removal and replacement because now the insert 15 is firmly secured in the wheel 10 instead of being a loose part as originally supplied. The washer 16 of course is removable with the nut 20 and its placement is facilitated because of the length of the bolt portion 20A upon which it rests when and as the nut is being threaded on bolt 12. This assembly process is also facilitated due to the annular tapered portion 20B on nut 20.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. A wheel structure comprising a centrally located wheel mounting portion having a central axis for supporting a tire thereabout, said mounting portion having tapered surfaces defining tapered apertures each of which is sized to accommodate one of a plurality of lug bolts circularly arranged in bolt circles of different radii, tapered insert means insertable in that end of each said aperture which is located on the inside of said wheel and which is tapered to receive said tapered insert means so that the tapered surfaces of said tapered insert means may slidingly wedge against said tapered surfaces of said wheel mounting portion defining said apertures so that said tapered surfaces of said tapered insert means and said tapered surfaces defining said apertures are substantially parallel to each other when said tapered insert means are wedged into said apertures, each said tapered insert means defining a hole through which one of such lug bolts may extend, cooperating means between said tapered insert means and said tapered apertures whereby each said insert means may have its hole oriented different radial distances from said central axis.

2. A structure as set forth in claim 1 in which said tapered insert is an element with a non-centrally located hole therein for accommodating said bolt lug.

3. A vehicle wheel assembly which is adaptable to wheel mounting bolt patterns of different radii, comprising:

a wheel having a central hub portion defining a plurality of radially spaced apertures sized to accommodate mounting bolts disposed in circular patterns of different radii, the surfaces of said central hub portion defining said apertures being tapered a substantial portion of their length and at an angle with respect to the axis of said wheel apertures to define tapered wedging surfaces for each said aperture adjacent one side of said wheel; and apertured inserts having a cross-sectional shape substantially conforming to that of said wheel apertures and sized to be received by said wheel apertures and tapered substantially uniformly end to end to be wedged against said tapered wedging surfaces of said wheel apertures, each said insert defining a hole sized to slidably receive a mounting bolt, the tapered surfaces of said tapered inserts and said tapered wedging surfaces of said wheel apertures (a) being substantially parallel to each other when said tapered inserts are wedged in said wheel apertures to tighten said wheel onto said mounting bolts when nuts are threaded thereon and (b) being configured relative to each other and to said holes in said inserts so that said holes may be positioned different radial distances from said central axis when said inserts are located in different positions in said wheel apertures.

4. The wheel assembly of claim 3 wherein said hole in each said tapered insert is eccentrically positioned with respect to the center of said insert, whereby turning said insert within said wheel aperture accommodates said wheel to bolt patterns of different radii.

5. The wheel assembly of claim 3 in which said tapered portions of said surfaces defining said wheel apertures are adjacent the inner side of said wheel to define tapered inner end sections for each said wheel aperture.

6. The wheel assembly of claim 5 which includes means engageable with the outer side of said wheel, said means being apertured to slidably receive said mounting bolts.

7. The wheel assembly of claim 6 wherein said means are washers and wherein said outer side of said wheel is recessed about said wheel apertures to receive said washers.

8. The wheel structure of claim 3 wherein each said tapered insert is tapered along its entire length.

9. The wheel structure of claim 3 wherein said tapered inserts are completely insertable in said apertures.

* * * * *